United States Patent [19]

Ohno

[11] Patent Number: 6,028,713
[45] Date of Patent: Feb. 22, 2000

[54] COMPACT LENS

[75] Inventor: Kazunori Ohno, Omiya, Japan

[73] Assignee: Fuji Photo Optical Co., Ltd., Omiya, Japan

[21] Appl. No.: 09/024,263

[22] Filed: Feb. 17, 1998

[30] Foreign Application Priority Data

Apr. 30, 1997 [JP] Japan .................................. 9-126506

[51] Int. Cl.[7] .................................................. G02B 21/02
[52] U.S. Cl. ........................................... 359/661; 359/784
[58] Field of Search .................................... 359/784, 781, 359/782, 770, 761, 645, 661, 686, 689

[56] References Cited

U.S. PATENT DOCUMENTS

| | | | |
|---|---|---|---|
| 5,202,795 | 4/1993 | Kashima | 359/784 |
| 5,398,136 | 3/1995 | Ohzawa et al. | 359/782 |
| 5,617,255 | 4/1997 | Yamada | 359/784 |
| 5,760,973 | 6/1998 | Kawamura | 359/782 |

FOREIGN PATENT DOCUMENTS 5-2204  1/1993  Japan .

Primary Examiner—Georgia Epps
Assistant Examiner—Younggil Timothy Lee
Attorney, Agent, or Firm—Arnold International; Bruce Y. Arnold

[57] ABSTRACT

A compact lens has a front lens group of positive refractive power and a rear lens group of negative refractive power. The front lens group is composed of, in order from a photographic object side, a negative lens element and a biconvex lens element having a surface of stronger curvature on the object side. Overall symmetry with respect to the rear lens group is achieved by using a negative meniscus lens element with its concave surface on the object side for the negative lens element in the front lens group. The rear lens group is composed of a negative meniscus lens element $L_3$ with its concave surface on the object side. This provides a compact overall lens structure of the so-called telephoto type having only three lens elements, making it possible to boost optical performance while being inexpensive. In addition, by satisfying certain conditional equations, it is possible to establish a good balance between the imaging performance at perimeter field angles and the compactness of the lens system as a whole.

6 Claims, 4 Drawing Sheets

Figure 2 Embodiment 1

Embodiment 2

Embodiment 3

COMPACT LENS

BACKGROUND OF THE INVENTION

The present invention relates to a lens for use in photography, and more particularly to a compact lens suitable for use in a camera having a simple construction with good imaging performance even at perimeter field angles. In recent years, leisure cameras which are lightweight, portable and inexpensive have been strongly desired and, accompanying this, lenses have been required which are compact and yet inexpensive and of high performance.

Development of a photographic lens that has a long focal length and is relatively inexpensive has been conducted previously. For example, a lens having a three-group structure known as a triplet has long been known to be an inexpensive lens. A lens having a triplet structure has a certain level of performance that is well-matched with the performance required of a camera, so such a lens is widely used in cameras. However, when the ratio of the overall lens length (defined as the on-axis distance from the lens element surface nearest an object side to the image plane of the compact lens) divided by the focal length of the compact lens becomes larger than 1.1, the curvature of field becomes too large, the imaging performance at perimeter field angles deteriorates, and it becomes difficult to satisfy the demand for a high performance lens.

On the other hand, numerous lenses of the telephoto type with a positive refractive power that have been advanced have been known as photography lenses with a short overall lens length, such as the one disclosed in Japanese Laid-Open Patent Publication 5-2204. However, the aspherical nature of these lenses is strong because the positive refractive power needs to be strong, resulting in there being room for improvement in imaging performance with respect to spherical aberration, coma, distortion, and lateral color. Thus, obtaining high performance with telephoto-type lenses is difficult.

In addition, lenses having four-element structures have generally been useful in correcting aberrations, but the their cost is higher than that of the above-described triplet.

BRIEF SUMMARY OF THE INVENTION

An object of the present invention is to provide, for use in a camera, a high performance and inexpensive lens having a short overall lens length. The compact lens includes, in order from the photographic object side, a front lens group of a positive refractive power and a rear lens group of negative refractive power. The front lens group is composed of a negative lens element having surfaces of different refractive power with its surface of stronger curvature being concave and on the object side. The front lens group also includes a biconvex lens element having surfaces of different refractive power with its surface of stronger curvature on the object side.

Aberrations such as coma, distortion, and lateral color are reduced by providing the lens structure with overall symmetry. Symmetry with respect to the rear lens group is achieved by using a negative meniscus lens element having its concave surface on the object side so as to balance the negative lens element of the front lens group. Thus, a compact overall lens structure of the so-called telephoto type having only three lens elements is provided, making it possible to boost optical performance while being inexpensive. By satisfying certain conditional equations, it is possible to establish a good balance between the imaging performance at perimeter field angles and the compactness of the lens system as a whole.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
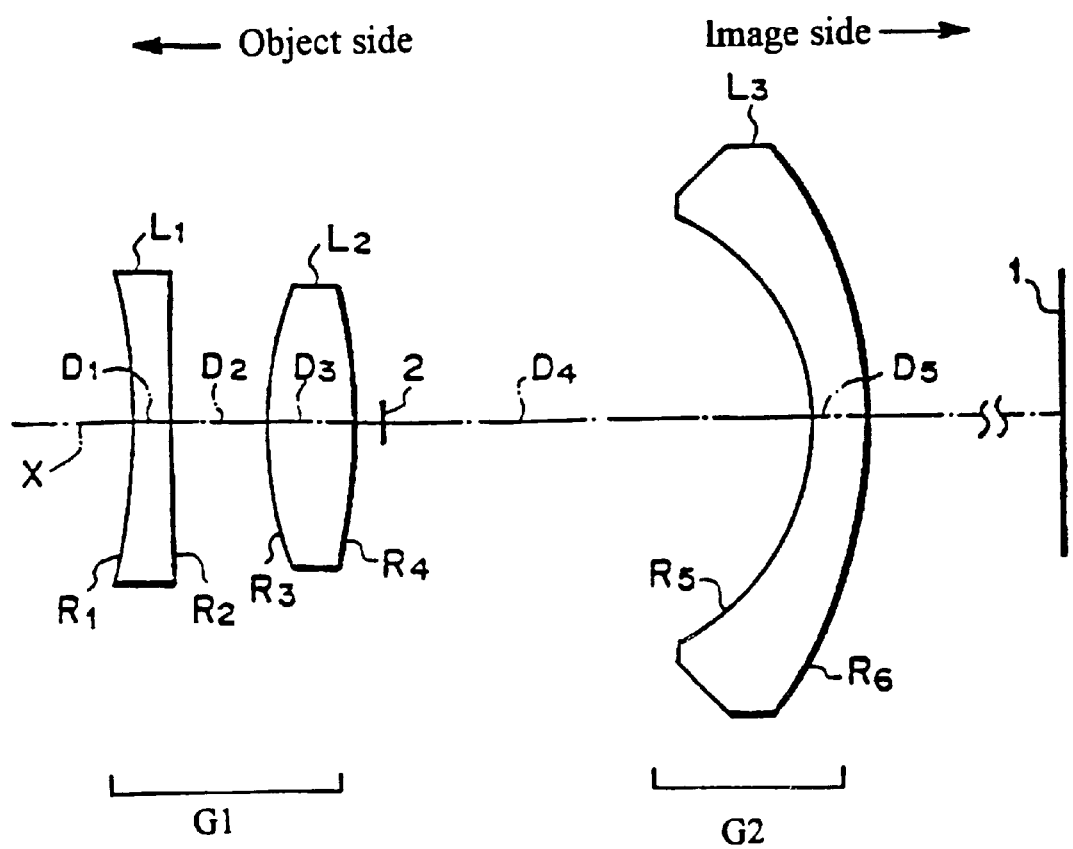
FIG. 1 is a schematic drawing showing the basic lens element structure of the compact lens of the present invention.

The compact lens of the present invention is a telephoto-type lens composed of a front lens group G1 and a rear lens group G2. The front lens group G1 has positive refractive power and the rear lens group G2 has negative refractive power. This allows the overall lens length L (not illustrated, but defined as the distance from the lens element surface nearest the object side to the photographic image plane) to be less than the focal length f (not illustrated). Hence, it is possible to shorten the overall lens length L. Furthermore, symmetry with respect to rear lens group G2 is achieved because negative lens element $L_1$ nearest the object side in the front lens group G1 has a concave surface on the object side and this surface is of stronger curvature than the other surface of negative lens element $L_1$. The front lens group G1 of positive refractive power also is composed of a biconvex lens element $L_2$ having surfaces of different refractive power with the surface of stronger curvature on the object side. Lens element $L_2$ is positioned on the image side of lens element $L_1$. The rear lens group G2 is composed of a negative meniscus lens element $L_3$ with its concave surface on the object side. Thus, the overall structure is that of a compact lens of the so-called telephoto-type having a three lens element composition. Such a structure achieves the object of the present invention, which is to boost performance while being inexpensive.

With this composition, it is possible to shorten the overall lens length and to improve the imaging performance of the compact lens at perimeter field angles by improving the coma, distortion, and lateral color. This is achieved by providing symmetry to the entire system by positioning a biconvex lens element $L_2$ between the negative lens element $L_1$ and the negative meniscus lens element $L_3$ of the rear lens group.

However, with this composition a concave lens element is positioned nearest the object side and, in order to further shorten the overall lens length L, it is preferable to make the inter-group distance $D_4$ between the front lens group and the rear lens group only reasonably large, so that the overall lens length does not become too long.

Conditional equation (1) indicates the range wherein a good balance is obtained between the imaging performance at perimeter field angles and the compactness of the lens. That is to say, if the telephoto ratio L/f of the compact lens is made smaller than the lower limit in this conditional equation, the overall lens length becomes smaller and the lens is made more compact, but the refractive powers of the front and rear groups become strong and the asymmetry becomes strong, causing the performance at the image perimeter to deteriorate.

On the other hand, when the telephoto ratio L/f of the compact lens is made larger than the upper limit in this conditional equation, the symmetry of the lens system as a whole improves, which is beneficial to the imaging performance at the periphery of the image, but the overall lens length becomes longer, which is contrary to the aim of the present invention.

Conditional equation (2) stipulates the length of the inter-group distance $D_4$ between the front group having a positive refractive power and the rear group having a negative refractive power, and when this is smaller than the lower limit, the refractive powers of the front and rear groups must each be made stronger in order to satisfy the conditional equation (1), and as a result the asymmetry of the entire system becomes too strong, causing the imaging performance to deteriorate. Conversely, when this length is larger than the upper limit, the distance between the front and rear groups becomes large, the refractive powers of the front and rear groups become weaker and the perimeter performance can be improved, but the lens element diameters on the object side and the image side become too large, making it difficult to achieve compactness.

The negative lens element $L_1$ positioned nearest the object side has a concave surface on the object side, and is designed so that the negative refractive power does not become strong while having a strong color dispersion, and takes into consideration aberration correction for the entire system by eliminating the convergence action of the biconvex lens element $L_2$ so that the performance is enhanced with a telephoto-type design.

Furthermore, when the refractive power of the biconvex lens element $L_2$ is strong, the spherical aberration becomes excessively large and the imaging performance over the field as a whole worsens, and consequently, by making at least one surface aspherical out of the front and rear surfaces of the biconvex lens element $L_2$, it is possible to prevent the spherical aberration of the system as a whole from becoming excessively large.

However, the deterioration of the perimeter image quality conversely becomes large because of this aspherical surface. Consequently it is desirable to make at least one of the surfaces of the negative lens element $L_1$, aspherical. The distance $D_2$ between the negative lens element $L_1$ and the biconvex lens element $L_2$ has an effect on the efficacy of these aspherical surfaces.

Conditional equation (3) takes into consideration these effects on the system as a whole. That is to say, if $D_2/f$ is made less than the lower limit of this conditional equation, the overall lens length of the compact lens becomes smaller, but the difference between the height of the beam that is incident on the negative lens element $L_1$ of the central light rays of the field and the height of the beam that is incident on the negative lens element $L_1$ at the perimeter field angle becomes too small. Thus, the aspherical surface effects of each are not sufficient. That is to say, for lower spherical aberration and better imaging at the perimeter of the image, the efficacy of the aspherical surfaces on lens elements $L_1$ and $L_2$ depends on a sufficient difference in beam heights. However $D_2$ may become too small and the aspherical surface efficacy of the two surfaces may interfere with each other, making it impossible to demonstrate aberration correction in both surfaces so as to improve the overall aberrations.

On the other hand, when $D_2$ exceeds the upper limit in conditional equation (3), spherical aberration and imaging performance at the perimeter of the image both improve. However, the overall lens length becomes too long, making it difficult to achieve compactness of the lens system.

By making at least one surface of each of the above-described lens elements aspheric, and by making these lenses of an organic material, production of the aspherical surfaces is facilitated and production costs are minimized. Of course, it is possible to make the lens element surfaces aspheric even when the lens element is made of glass, but the problem arises that production costs are high.

In addition to making the above-described lens elements $L_1$ and $L_2$ of an organic material, an organic material is also preferred for the lens element $L_3$ of the rear lens group. The lens element $L_3$ has an effect on imaging performance primarily in the following aberrations: curvature of field, distortion and lateral color. However, it is nevertheless possible to make this lens element of an organic material. This allows the production cost of the compact lens to be further lowered.

FIG. 1 shows the basic lens construction and is representative of embodiments 1 through 3. As shown in FIG. 1, the system is composed of three lens elements comprising, in order from the object side: a front lens group having a positive refractive power and a rear lens group of negative refractive power. The front lens group is composed of a negative lens element $L_1$ with a concave surface of stronger curvature on the object side, and a biconvex lens element $L_2$ with a surface of stronger curvature on the object side. The rear lens group composed of a negative meniscus lens element $L_3$ with its concave surface on the object side. A diaphragm 2 is arranged between these two lens groups, and collimated light rays are brought to focus at the image plane 1.

In addition, the surface on the image side of biconcave lens element $L_1$ and the surface on the image side of biconvex lens element $L_2$ are figured to be aspheric. In Embodiment 2, the surface on the image side of the lens element $L_3$ is also made to be aspheric. In Embodiment 3, the surface on the object side of the lens $L_1$ is also made to be aspheric.

In addition, each of embodiments 1–3 satisfy the following conditional equations.

$$0.90 < L/f < 1.05 \quad (1)$$
$$0.18 < D_4/f < 0.36 \quad (2)$$
$$0.02 < D_2/f < 0.07 \quad (3)$$

where:

L is the overall lens length (i.e., the on-axis distance from the lens element surface positioned nearest the object side to the image plane), $D_4$ is the distance between the front lens group and the rear lens group, $D_2$ is the distance between the lens elements L1 and L2, and f is the focal length of the compact lens.

Three embodiments of the present invention will now be described using actual numerical values.

Embodiment 1

Table 1 shows the value of the radius of curvature R (in mm) of each lens element surface, the on-axis surface spacing D (in mm), as well as the value of the index of refraction $N_d$ and the Abbe number $v_d$ for the sodium d line of each lens element of embodiment 1. The surface numbers (#) in the table indicate the surface order from the object side.

TABLE 1

| # | R | D | $N_d$ | $v_d$ |
|---|---|---|---|---|
| 1 | −23.8938 | 1.1752 | 1.58364 | 30.4 |
| 2* | 114.6632 | 3.1472 | | |
| 3 | 12.5302 | 2.6633 | 1.49023 | 57.6 |
| 4* | −23.2347 | 14.4420 | | |
| 5 | −7.4988 | 1.5980 | 1.49023 | 57.6 |
| 6 | −15.3656 | | | |

The diaphragm is positioned at a location 0.94 mm to the image plane side of surface 4. In addition, the surfaces with a* to the right of the surface number in Table 1, as described above, are figured to be aspheric, with an aspheric shape as indicated in equation (4) below.

$$Z = CY^2/\{1+(1-KC^2Y^2)^{1/2}\} + A_4Y^4 + A_6Y^6 + A_8Y^8 + A_{10}Y^{10} \quad (4)$$

where

Z is the distance of a point on the aspherical surface from the tangential plane at the lens element surface vertex, C is the curvature (1/R) of aspherical surface vertex, Y is the height (in mm) from the optical axis, K is the eccentricity, and $A_4, A_6, A_8$, and $A_{10}$ are the coefficient constants of the 4th, 6th, 8th and 10th exponential number terms, respectively, for the aspheric surface.

In Table 2 below, the values for each of the constants C, K, $A_4, A_6, A_8$, and $A_{10}$ of equation (4), above, are given for the aspheric surfaces indicated by * in Table 1.

TABLE 2

| # | C | K | $A_4$ | $A_6$ | $A_8$ | $A_{10}$ |
|---|---|---|---|---|---|---|
| 2 | 0.008721 | 1.00934 | $6.1888 \times 10^{-5}$ | $-1.2583 \times 10^{-9}$ | $-8.0788 \times 10^{-15}$ | $-5.1120 \times 10^{-20}$ |
| 4 | −0.133355 | 0.27152 | $3.9535 \times 10^{-5}$ | $9.7559 \times 10^{-9}$ | $6.6614 \times 10^{-14}$ | $3.5636 \times 10^{-19}$ | f = 54.95  l' = 30.47  L = 53.50  $f_1$ = 27.18
L/f = 0.974  $D_2$/f = 0.057  $D_4$/f = 0.263

In this embodiment, as shown in the center portion of Table 2, the focal length f of the lens system as a whole is 54.95 mm, the back focus l' is 30.47 mm, the overall lens length L is 53.50 mm, and the focal length $f_1$ of the front group is 27.18 mm. In addition, as shown in the bottom portion of Table 2, L/f is 0.974, $D_2$/f is 0.057, and $D_4$/f is 0.263. Thus conditional equations (1)–(3) above are satisfied for embodiment 1.

Figure 2:
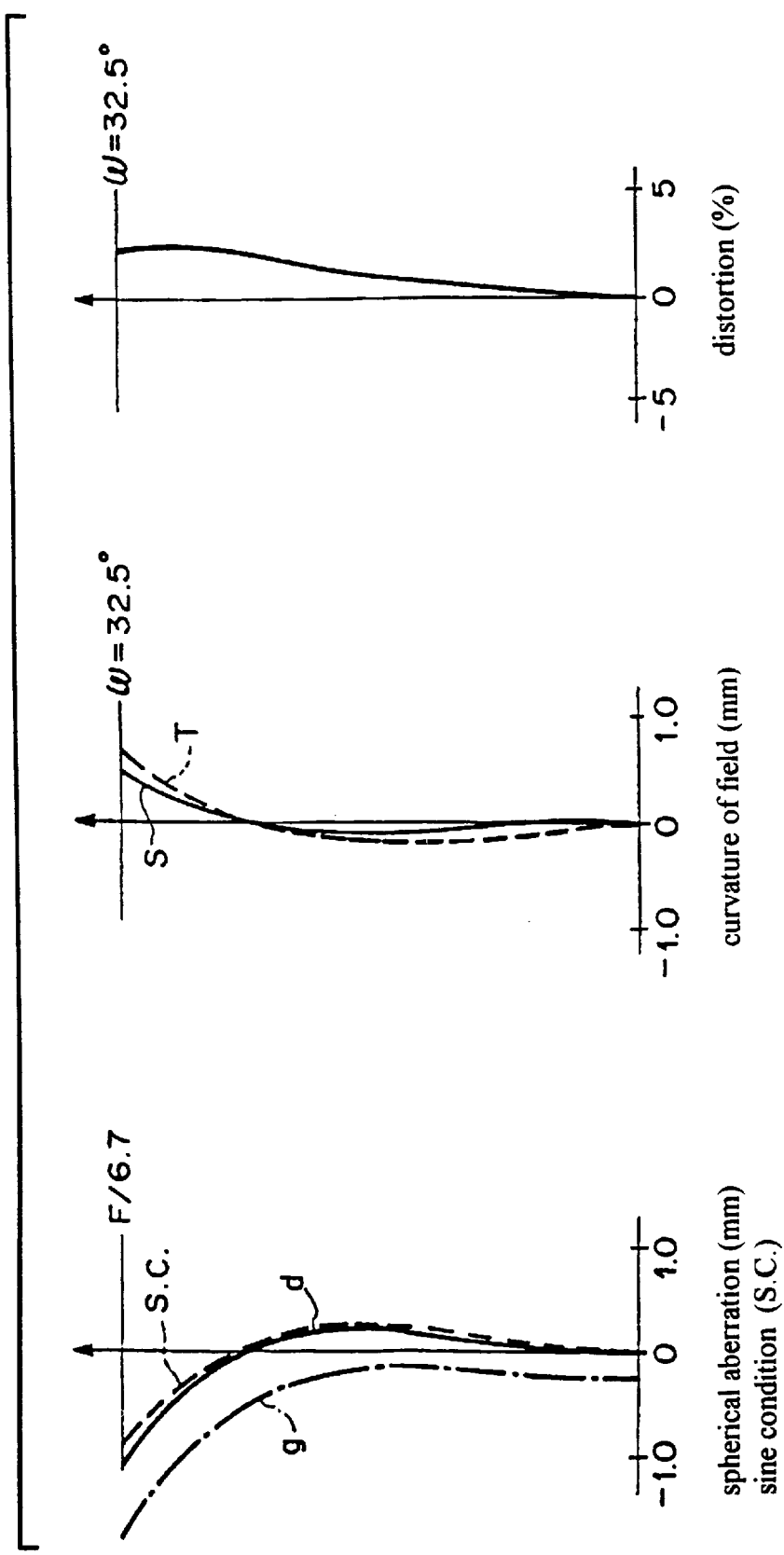
FIG. 2 illustrates the spherical aberration, curvature of field, and distortion of the compact lens of embodiment 1 of the invention.

FIG. 2 shows the spherical aberration, curvature of field, and distortion for the compact lens of embodiment 1. In addition, the sine condition is shown in the spherical aberration diagram, wherein 107 indicates the half-field angle. As is clear from FIG. 2, the spherical aberration, curvature of field, and distortion of the compact lens of embodiment 1 are acceptably low.

Embodiment 2

Table 3 below shows the values of the radius of curvature R (in mm) of each lens surface, the on-axis surface spacing D (in mm), as well as the values of the index of refraction $N_d$ and the Abbe number $v_d$ (for the sodium d line) of each lens element which apply to embodiment 2. The surface numbers # in the table indicate the surface order from the object side. Those with a * to the right of the the surface number are figured to be aspheric.

TABLE 3

| # | R | D | $N_d$ | $v_d$ |
|---|---|---|---|---|
| 1 | −17.7187 | 2.3498 | 1.58364 | 30.3 |
| 2* | 186.6045 | 1.1637 | | |
| 3 | 11.7024 | 2.6633 | 1.49023 | 57.6 |
| 4* | −17.1528 | 14.4414 | | |
| 5 | −7.0669 | 1.5980 | 1.49023 | 57.6 |
| 6 | −13.7232 | | | |

The diaphragm is positioned at a location 0.94 mm to the image plane side of surface 4. In addition, the surfaces with a * to the right of the surface number in Table 3, as described above, are figured to be aspheric, with an aspheric shape as indicated in equation (4) above.

In Table 4 below, the values for each of the constants C, K, $A_4, A_6, A_8$, and $A_{10}$ of equation (4), above, are given for the aspheric surfaces indicated by * in Table 3.

TABLE 4

| # | C | K | $A_4$ | $A_6$ | $A_8$ | $A_{10}$ |
|---|---|---|---|---|---|---|
| 2 | 0.00536 | 1.00918 | $9.5398 \times 10^{-5}$ | $-1.4818 \times 10^{-9}$ | $-1.1395 \times 10^{-14}$ | $-7.1596 \times 10^{-20}$ |
| 4 | -0.05830 | -0.25892 | $4.2892 \times 10^{-5}$ | $9.8505 \times 10^{-9}$ | $6.6989 \times 10^{-14}$ | $3.6080 \times 10^{-19}$ |
| 6 | -0.07287 | 1.51352 | $2.5342 \times 10^{-5}$ | $-6.9226 \times 10^{-10}$ | $-2.3284 \times 10^{-14}$ | $-5.0492 \times 10^{-19}$ | f = 42.84    l' = 20.88    L = 43.10    $f_1$ = 24.89
L/f = 1.006    $D_2$/f = 0.027    $D_4$/f = 0.337

In this embodiment as shown in the middle portion of Table 4, the focal length f of the lens system as a whole is 42.84 mm, the back focus l' is 20.88 mm, the overall lens length L is 43.10 mm, and the focal length $f_1$ of the front group is 24.89 mm. In addition, as shown in the bottom portion of Table 4, L/f is 1.006, $D_2$/f is 0.027, and $D_4$/f is 0.337. Thus, conditional equations (1)–(3) above are satisfied for embodiment 2.

Figure 3:
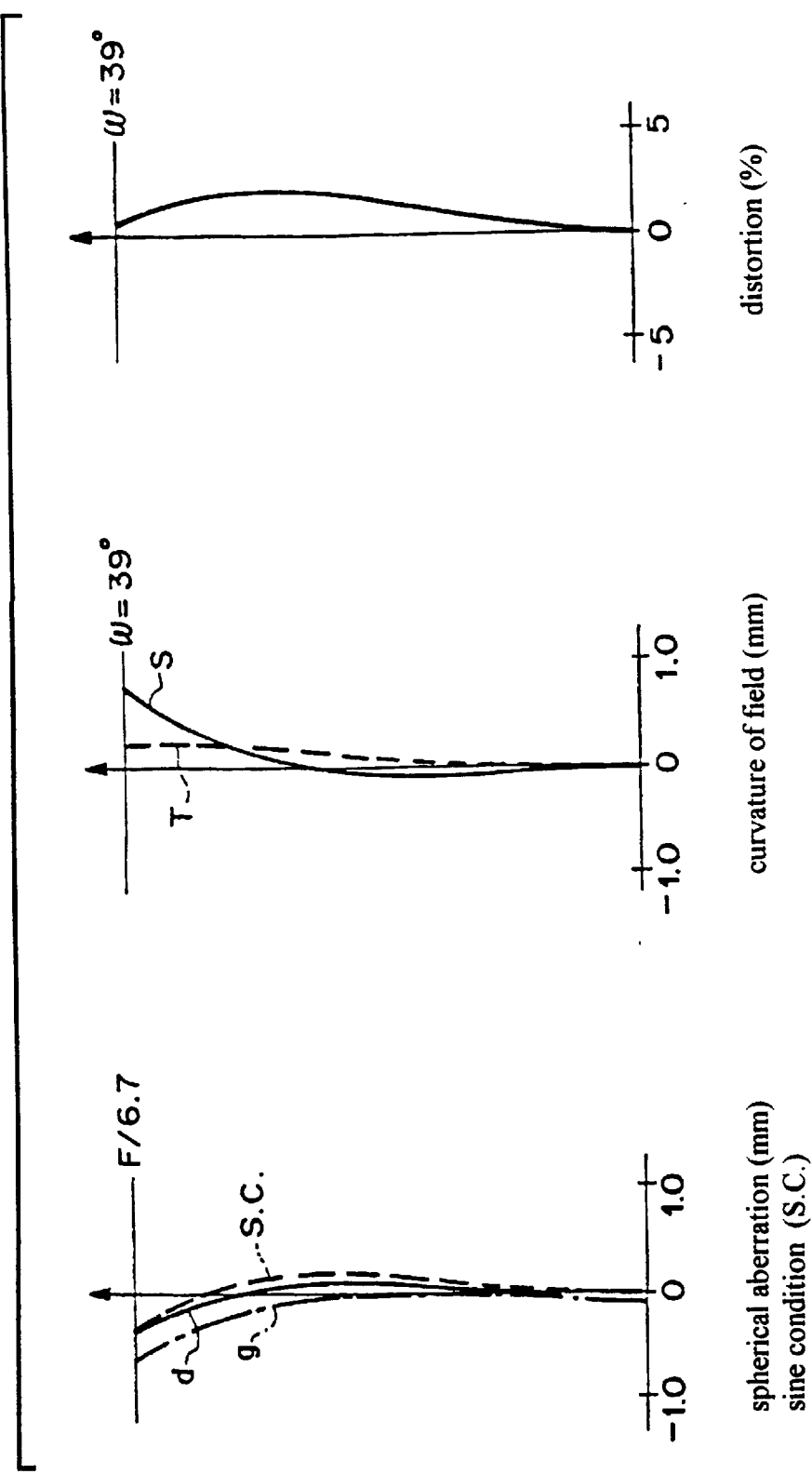
FIG. 3 illustrates the spherical aberration, curvature of field, and distortion of the compact lens of embodiment 2 of the invention.

FIG. 3 shows the spherical aberration, curvature of field, and distortion for the compact lens of embodiment 2. In addition, the sine condition is shown in the spherical aberration diagram, wherein ω indicates the half-field angle. As is clear from FIG. 3, the spherical aberration, curvature of field, and distortion of the compact lens of embodiment 2 are acceptably low.

Embodiment 3

Table 5, below, shows the values of the radius of curvature R (in mm) of each lens surface, the on-axis surface spacing D (in mm), as well as the values of the index of refraction $N_d$ and the Abbe number $v_d$ (for the sodium d line) of each lens element which apply to embodiment 1. The surface numbers # in the table indicate the surface order from the object side.

TABLE 5

| # | R | D | $N_d$ | $V_d$ |
|---|---|---|---|---|
| 1* | -14.5523 | 1.1750 | 1.58364 | 30.3 |
| 2* | -59.1405 | 1.3528 | | |
| 3 | 10.3109 | 2.6633 | 1.49023 | 57.6 |
| 4* | -29.0837 | 11.2063 | | |
| 5 | -6.2044 | 1.5980 | 1.49023 | 57.6 |
| 6 | -10.7541 | | | |

The diaphragm is positioned at a location 0.94 mm to the image plane side of surface 4. In addition, the surfaces with a * to the right of the surface number in Table 5, as described above, are figured to be aspheric, with an aspheric shape as indicated in equation (4) above. In Table 6 below, the values for each of the constants C, K, $A_4$, $A_6$, $A_8$, and $A_{10}$ of equation (4), above, are the aspheric surfaces indicated by * in Table 5.

TABLE 6

| # | C | K | $A_4$ | $A_6$ | $A_8$ | $A_{10}$ |
|---|---|---|---|---|---|---|
| 1 | -0.068718 | -3.27209 | $5.4107 \times 10^{-5}$ | $5.1019 \times 10^{-9}$ | $5.8331 \times 10^{-14}$ | $5.7318 \times 10^{-19}$ |
| 2 | -0.016909 | 0.29185 | $2.2533 \times 10^{-4}$ | $-8.6269 \times 10^{-10}$ | $-2.4183 \times 10^{-14}$ | $-2.9223 \times 10^{-19}$ |
| 4 | -0.034384 | -0.16587 | $5.3080 \times 10^{-5}$ | $2.8390 \times 10^{-9}$ | $1.4069 \times 10^{-14}$ | $6.1996 \times 10^{-20}$ | f = 53.63    l' = 32.88    L = 50.88    $f_1$ = 26.07
L/f = 0.949    $D_2$/f = 0.025    $D_4$/f = 0.209

In embodiment 3, as shown in the center portion of Table 6, the focal length f of the lens system as a whole is 53.63 mm, the back focus l' is 32.88 mm, the overall lens length L is 50.88 mm, and the focal length $f_1$ of the front group is 26.07 mm. In addition, as shown in the bottom portion of Table 6, L/f is 0.949, $D_2$/f is 0.025 and $D_4$/f is 0.209. Thus, conditional equations (1)–(3) are satisfied for embodiment 3.

Figure 4:
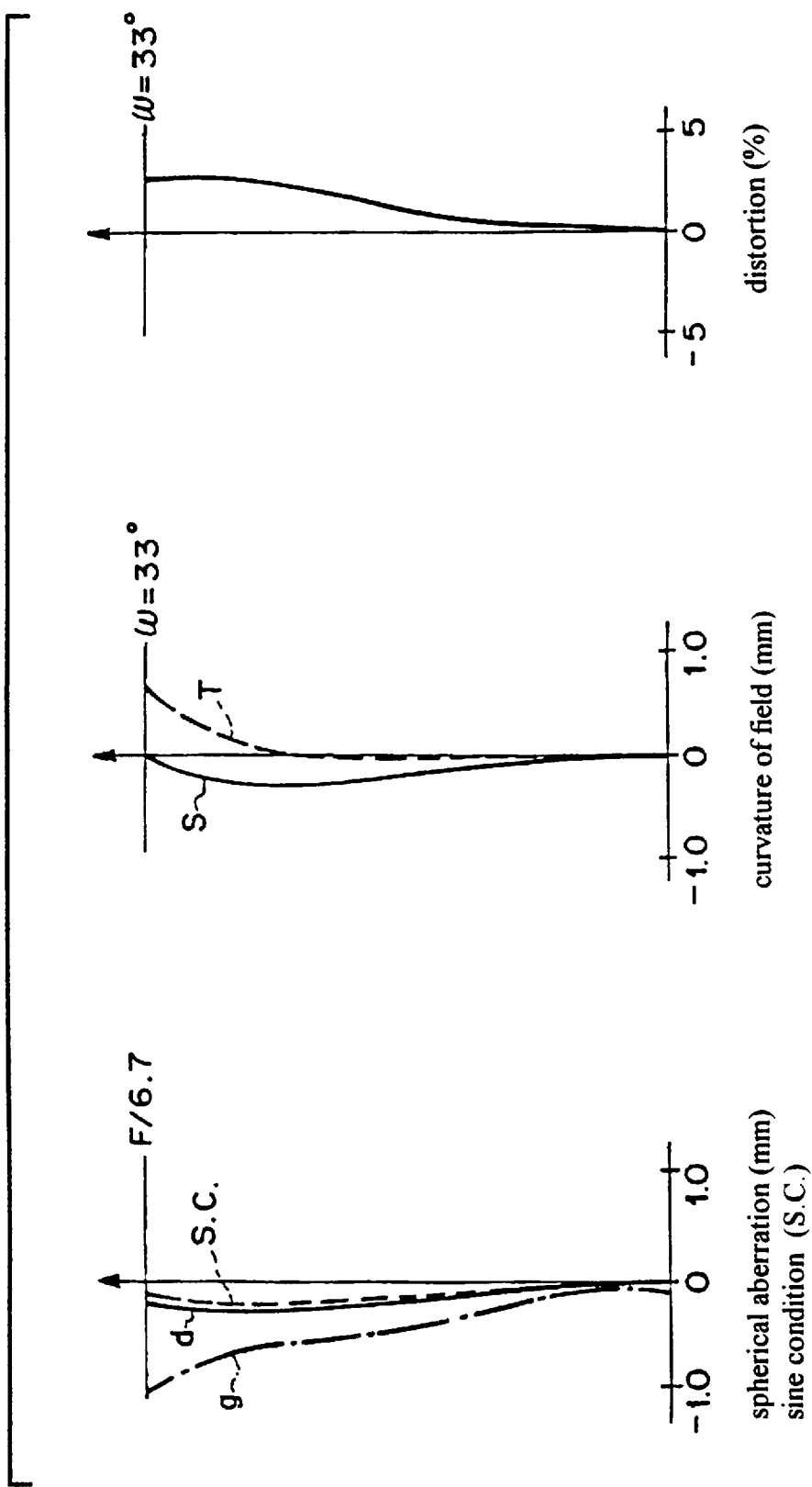
FIG. 4 illustrates the spherical aberration, curvature of field, and distortion of the compact lens of embodiment 3 of the invention.

FIG. 4 shows the spherical aberration, curvature of field, and distortion for the compact lens of embodiment 3. In addition, the sine condition is shown in the spherical aberration diagram, wherein ω indicates the half-field angle. As is clear from FIG. 4, the spherical aberration, curvature of field, and distortion of the compact lens of embodiment 3 are acceptably low.

The invention being thus described, it will be obvious that the same may be varied in many ways. Such variations are not to be regarded as a departure from the spirit and scope of the invention. For example, rather than the aspheric surfaces being formed by figuring a spherical surface, these surfaces may be formed directly by spin casting or using a mold or die. Also, the appropriate selection of the shape of the lens elements which comprise each of the lens groups, the number of aspheric surfaces, and the shape of the aspheric surfaces may be varied. All such modifications as would be obvious to one skilled in the art are intended to be included within the scope of the following claims.

What is claimed is:

1. A compact lens including a three lens element structure arranged along an optical axis, said compact lens comprising, in order from the object side:

a front lens group of positive refractive power, said front lens group consisting of only two lens elements having refractive power, said two lens elements being a negative lens element with a concave surface on the object side and a biconvex lens element having surfaces of different refractive power with a surface of stronger curvature on the object side; and a rear lens group having a negative refractive power and comprising a negative meniscus lens element with its concave surface on the object side;

wherein the following conditional equations are satisfied $$0.90 < L/f < 1.05$$

$$0.18 < D_4/f < 0.36$$

where
- L is the on-axis distance from the compact lens element surface nearest the object side to the image plane of the compact lens,
- f is the focal length of the compact lens, and
- $D_4$ is the on-axis surface spacing between the front lens group and the rear lens group;

wherein each of said two lens elements in the front lens group has at least one surface that is aspheric, and wherein the following conditional equation is satisfied:

$$0.02 < D_2/f < 0.07$$

where $D_2$ is the distance between said two lens elements in the front lens group.

2. The compact lens as defined in claim 1, wherein said two lens elements comprising the front lens group are each comprised of an organic material.

3. The compact lens as defined in claim 2, wherein the negative lens element comprising the rear lens group is comprised of an organic material.

4. The compact lens as defined in claim 1, and further comprising said compact lens having the construction parameters as set forth below:

| # | R | D | $N_d$ | $V_d$ |
|---|---|---|---|---|
| 1 | −23.8938 | 1.1752 | 1.58364 | 30.3 |
| 2 | 114.6632 | 3.1472 | | |
| 3 | 12.5302 | 2.6633 | 1.49023 | 57.6 |
| 4 | −23.2347 | 14.4420 | | |
| 5 | −7.4988 | 1.5980 | 1.49023 | 57.6 |
| 6 | −15.3656 | | | | where # is the surface number from the object side, R is the radius of curvature in mm, D is the on-axis surface spacing in mm, $N_d$ is the index of refraction and $V_d$ the Abbe number for the sodium d line of the lens element, and wherein surface #2 and surface #4 are figured to be aspheric.

5. The compact lens as defined in claim 1, and further comprising said compact lens having the construction parameters as set forth below:

| # | R | D | $N_d$ | $V_d$ |
|---|---|---|---|---|
| 1 | −17.7187 | 2.3498 | 1.58364 | 30.3 |
| 2 | 186.6045 | 1.1637 | | |
| 3 | 11.7024 | 2.6633 | 1.49023 | 57.6 |
| 4 | −17.1528 | 14.4414 | | |
| 5 | −7.0669 | 1.5980 | 1.49023 | 57.6 |
| 6 | −13.7232 | | | | where # is the surface number from the object side, R is the radius of curvature in mm, D is the on-axis surface spacing in mm, $N_d$ is the index of refraction and $v_d$ the Abbe number for the sodium d line of the lens element, and wherein surface #2, surface #4 and surface #6 are figured to be aspheric.

6. The compact lens as defined in claim 1, and further comprising said compact lens having the construction parameters as set forth below:

| # | R | D | $N_d$ | $V_d$ |
|---|---|---|---|---|
| 1 | −14.5523 | 2.3498 | 1.58364 | 30.3 |
| 2 | −59.1405 | 1.3528 | | |
| 3 | 10.3109 | 2.6633 | 1.49023 | 57.6 |
| 4 | −29.0837 | 11.2063 | | |
| 5 | −6.2044 | 1.5980 | 1.49023 | 57.6 |
| 6 | −10.7541 | | | | where # is the surface number from the object side, R is the radius of curvature in mm, D is the on-axis surface spacing in mm, $N_d$ is the index of refraction and $v_d$ the Abbe number for the sodium d line of the lens element, and wherein surface #1, surface #2, and surface #4 are figured to be aspheric.

* * * * *

UNITED STATES PATENT AND TRADEMARK OFFICE
CERTIFICATE OF CORRECTION

PATENT NO : 6,028,713
DATED : Feb. 22, 2000
INVENTOR(S): Ohno

It is certified that error appears in the above-identified patent and that said Letters Patent are hereby corrected as shown below:

In col. 6, line 32 "107" should be -- $\omega$ --

In Table 3, first column, "6" should be -- 6* --

In col. 8, line 2 "are the aspheric" should be -- are given for the aspheric --

In claim 4, "30.3" in the right column of the table should be -- 30.4 --.

In claim 6, "2.3498" in the middle column of the table should be -- 1.1750 --.

Signed and Sealed this

Third Day of April, 2001

*Attest:*

NICHOLAS P. GODICI

*Attesting Officer*   Acting Director of the United States Patent and Trademark Office